(12) United States Patent
Ekmečić et al.

(10) Patent No.: US 12,259,809 B2
(45) Date of Patent: Mar. 25, 2025

(54) SELECTIVE TESTING OF PRE-COMPILED EXTENDED REALITY OPERATING SYSTEMS

(71) Applicant: Snap Inc., Santa Monica, CA (US)

(72) Inventors: Emil Ekmečić, Santa Monica, CA (US); Terry Tata, Miami, FL (US)

(73) Assignee: Snap Inc., Santa Monica, CA (US)

( * ) Notice: Subject to any disclaimer, the term of this patent is extended or adjusted under 35 U.S.C. 154(b) by 139 days.

(21) Appl. No.: 18/311,741

(22) Filed: May 3, 2023

(65) Prior Publication Data

US 2024/0370358 A1    Nov. 7, 2024

(51) Int. Cl.
*G06F 11/36*    (2006.01)
*G06F 8/61*    (2018.01)
*G06F 11/3668*    (2025.01)

(52) U.S. Cl.
CPC .......... *G06F 11/3688* (2013.01); *G06F 8/61* (2013.01); *G06F 11/3692* (2013.01)

(58) Field of Classification Search
CPC .................................................... G06F 11/36
See application file for complete search history.

(56) References Cited

U.S. PATENT DOCUMENTS

| | | | |
|---|---|---|---|
| 8,190,587 B1 * | 5/2012 | CaraDonna | G06F 8/76 717/169 |
| 9,354,865 B2 | 5/2016 | Fiebig et al. | |
| 9,588,876 B2 | 3/2017 | Swierc et al. | |
| 9,734,043 B2 | 8/2017 | Crova et al. | |
| 10,175,978 B2 | 1/2019 | Biddle et al. | |
| 10,303,464 B1 | 5/2019 | Wolfson et al. | |
| 10,565,511 B1 | 2/2020 | Cui et al. | |
| 2014/0282459 A1 | 9/2014 | Hey et al. | |
| 2015/0143335 A1 | 5/2015 | Jain et al. | |
| 2017/0199737 A1 | 7/2017 | Bofferding et al. | |
| 2017/0262130 A1 * | 9/2017 | Lloyd | G06F 11/3688 |
| 2017/0337116 A1 * | 11/2017 | Negara | G06F 11/3636 |

(Continued)

FOREIGN PATENT DOCUMENTS

| | | |
|---|---|---|
| WO | WO-2019040543 A1 | 2/2019 |
| WO | 2024228963 | 11/2024 |

OTHER PUBLICATIONS

"International Application Serial No. PCT US2024 026881, International Search Report mailed Aug. 27, 2024", 4 pgs.

(Continued)

*Primary Examiner* — Jae U Jeon
(74) *Attorney, Agent, or Firm* — Schwegman Lundberg & Woessner, P.A.

(57) ABSTRACT

The disclosed examples provide a method that includes identifying a list of revisions for an Extended Reality (XR) operating system and dividing the list of revisions to set a currently selected revision. An already-compiled version of the currently selected revision of the XR operating system is retrieved and installed on an XR device. The method also includes initiating a test script for the XR device to test the XR operating system and receiving results of the test script. The method of dividing the list of revisions, retrieving and installing the already-compiled version, and initiating and receiving results of the test script is repeated until a revision that passes the test script is found to be adjacent to a revision on the list that fails the test script.

20 Claims, 11 Drawing Sheets

(56) References Cited

U.S. PATENT DOCUMENTS

2017/0351598 A1    12/2017  Rauenzahn et al.
2018/0101465 A1     4/2018  Keinan
2021/0311844 A1*   10/2021  Daniali ............... G06F 11/3419

OTHER PUBLICATIONS

"International Application Serial No. PCT US2024 026881, Written Opinion mailed Aug. 27, 2024", 8 pgs.

* cited by examiner

SELECTIVE TESTING OF PRE-COMPILED EXTENDED REALITY OPERATING SYSTEMS

TECHNICAL FIELD

The present disclosure relates generally to Extended Reality (XR) operating system testing, and more specifically to identifying errors in revisions of XR operating systems by selectively testing certain revisions.

BACKGROUND

The popularity of AR operating systems has increased dramatically in recent times, and has proliferated an abundance of AR application creation. AR operating systems combine elements of a traditional operating system with tools and libraries that allow developers to create AR experiences for users.

An AR operating system typically includes a variety of features, such as camera access, sensor fusion, 3D modeling, and rendering capabilities. These features allow AR applications to overlay digital content onto the real world, creating an immersive and interactive experience for users. As such, AR operating systems enable the ability to integrate with a wide range of devices, including smartphones, tablets, and wearables. Overall, augmented reality operating systems are an important tool for developers and businesses looking to create compelling AR experiences for their users. They provide a powerful platform for building immersive and interactive applications that can be accessed from a wide range of devices and platforms.

BRIEF DESCRIPTION OF THE SEVERAL VIEWS OF THE DRAWINGS

In the drawings, which are not necessarily drawn to scale, like numerals may describe similar components in different views. To identify the discussion of any particular element or act more easily, the most significant digit or digits in a reference number refer to the figure number in which that element is first introduced. Some non-limiting examples are illustrated in the figures of the accompanying drawings in which.

DETAILED DESCRIPTION

Figure 1:
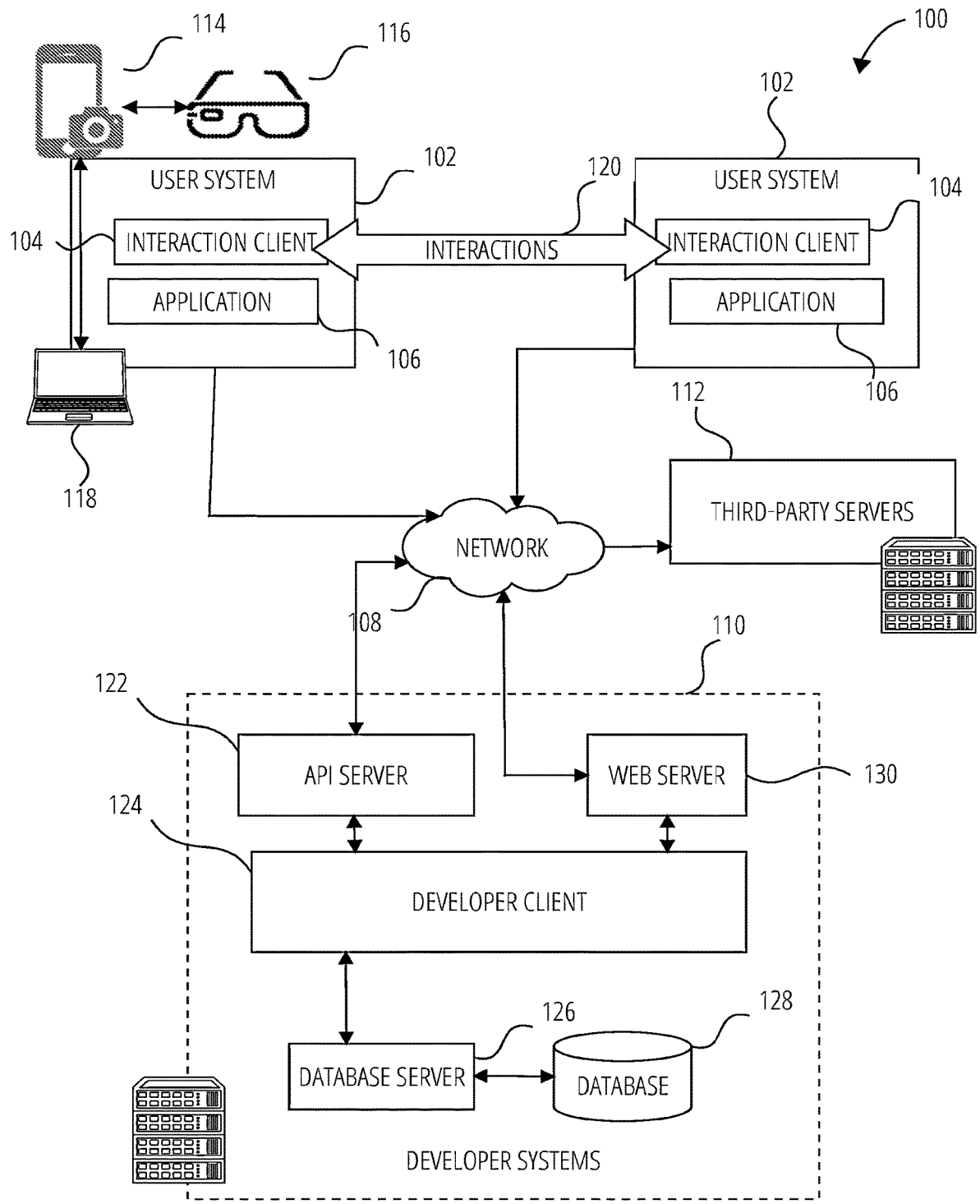
FIG. 1 is a diagrammatic representation of a networked environment in which the present disclosure may be deployed, according to some examples.

In an Extended Reality (XR) operating system (such as an AR system), developers often make many changes to software code to improve its functionality or fix any bugs that may exist, making it very complicated to pinpoint the specific revision that introduced the error. In traditional systems, testing typically occurs using the following steps. Developers first determine the nature of the error, its severity, and how it impacts the system. In order to locate the specific revision where the error was introduced, developers start by selecting a revision as the starting point (e.g., the latest revision). They then compile the operating system using the code from that revision. After compiling the operating system, developers run the test scripts that cover the relevant functionality. They look for the error in the test results to see if the issue is present in the selected revision.

If the error is found in the selected revision, developers move back to the previous revision and repeat the process of compiling the operating system and running the test scripts. They continue iterating through revisions until they find the revision where the error was introduced. Once the revision with the error has been identified, developers modify the code in that revision to correct the error, ensuring it aligns with the intended design and specifications.

From the steps outlined above, it can be challenging to identify which revision of the many revisions caused the error. This can become especially problematic with XR operating systems where thousands or tens of thousands of revisions are typically made and compiling each of the XR operating systems could take several hours. Traditional systems require developers to continuously recompile an entire operating system each time a test script is run, which slows down the overall testing process and consumes a great deal of hardware and software resources.

The disclosed techniques provide developer systems that enable developers to more quickly identify the revisions that caused a particular error. A developer system takes a list of all revisions (or a selected span of revisions) and divides the list to identify the middle revision. The developer system retrieves a precompiled version of the XR operating system that corresponds to the middle revision. The developer system flashes this precompiled version onto an XR device and tests whether this revision causes the error of concern via a test script.

If the tested XR operating system revision passes the test script, then the older revisions are no longer relevant. So the system removes older revisions from the list, and divides the remaining revisions to download, flash, and test. Alternatively if the tested XR operating system revision fails the test script, then the newer revisions are no longer relevant and removed from the list of revisions. This process is repeated until adjacent revisions where one revision passes and another fails is found. The failed revision adjacent to the passed revision is set as the revision that began introducing the error found in the latest revision.

Advantageously, the developer systems are able to avoid having to recompile source code revisions of the XR operating system and instead download precompiled versions from the cloud. Moreover, the developer systems are able to identify the problematic revisions of the XR operating system without having to check many revisions in chronological order. Bisecting the list of revisions enables the developer systems to identify the revision by testing at most $\log_2(n)$ revisions (e.g., 1100 revisions, maximum 10 revisions tested). Applying this method, developers identify problematic revisions in a few minutes instead of many hours, or potentially over the course of several days.

When the effects in this disclosure are considered in aggregate, one or more of the methodologies described herein may improve known systems, providing additional functionality (such as, but not limited to, the functionality mentioned above), making them easier, faster, or more intuitive to operate, and/or obviating a need for certain efforts or resources that otherwise would be involved in a debugging process. Computing resources used by one or more machines, databases, or networks may thus be more efficiently utilized or even reduced.

Networked Computing Environment

FIG. 1 is a block diagram showing an example interaction system 100 for facilitating interactions (e.g., exchanging text messages, conducting text audio and video calls, playing games, updating XR operating systems, or debugging XR operating systems) over a network. The interaction system 100 includes multiple user systems 102, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems 102), a developer system 110 and third-party servers 112). An interaction client 104 can also communicate with locally hosted applications 106 using Applications Program Interfaces (APIs).

Each user system 102 may include multiple user devices, such as a mobile device 114, head-wearable apparatus 116, and a computer client device 118 that are communicatively connected to exchange data and messages.

An interaction client 104 interacts with other interaction clients 104 and with the developer system 110 via the network 108. The data exchanged between the interaction clients 104 (e.g., interactions 120) and between the interaction clients 104 and the developer system 110 includes functions (e.g., commands to invoke functions) and payload data (e.g., text, audio, video, or other multimedia data).

The developer system 110 provides developer functionality via the network 108 to the interaction clients 104. While certain functions of the interaction system 100 are described herein as being performed by either an interaction client 104 or by the developer system 110, the location of certain functionality either within the interaction client 104 or the developer system 110 may be a design choice. For example, it may be technically preferable to initially deploy particular technology and functionality within the developer system 110 but to later migrate this technology and functionality to the interaction client 104 where a user system 102 has sufficient processing capacity.

The developer system 110 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, entity relationship information, live event information, XR operating systems, applications running on XR operating systems, source code, object code, and/or the like. Data exchanges within the interaction system 100 are invoked and controlled through functions available via user interfaces (UIs) of the interaction clients 104.

Turning now specifically to the developer system 110, an API server 122 is coupled to and provides programmatic interfaces to developer client 124, making the functions of the developer client 124 accessible to interaction clients 104, other applications 106 and third-party server 112. The developer client 124 is communicatively coupled to a database server 126, facilitating access to a database 128 that stores data associated with interactions processed by the developer client 124. Similarly, a web server 130 is coupled to the developer client 124 and provides web-based interfaces to the developer client 124. To this end, the web server 130 processes incoming network requests over the Hypertext Transfer Protocol (HTTP) and several other related protocols.

The API server 122 receives and transmits interaction data (e.g., commands and message payloads) between the developer client 124 and the user systems 102 (and, for example, interaction clients 104 and other application 106) and the third-party server 112. Specifically, the API server 122 provides a set of interfaces (e.g., routines and protocols) that can be called or queried by the interaction client 104 and other applications 106 to invoke functionality of the developer client 124. The API server 122 exposes various functions supported by the developer client 124, including account registration; login functionality; the sending of interaction data, via the developer client 124, from a particular interaction client 104 to another interaction client 104; the communication of media files (e.g., images or video) from an interaction client 104 to the developer client 124; the settings of a collection of media data (e.g., a story); the retrieval of a list of friends of a user of a user system 102; the retrieval of messages and content; the addition and deletion of entities (e.g., friends) to an entity relationship graph (e.g., the entity graph 310); the location of friends within an entity relationship graph; and opening an application event (e.g., relating to the interaction client 104).

The developer client 124 hosts multiple systems and subsystems, described below with reference to FIG. 2.

Linked Applications

Returning to the interaction client 104, features and functions of an external resource (e.g., a linked application 106 or applet) are made available to a user via an interface of the interaction client 104. The XR operating system can include certain applications that enable linked applications and/or enable the installation of the linked applications. Bugs identified in the linked applications could be determined using the methods described herein.

In this context, "external" refers to the fact that the application 106 or applet is external to the interaction client 104. The external resource is often provided by a third party but may also be provided by the creator or provider of the interaction client 104. The interaction client 104 receives a user selection of an option to launch or access features of such an external resource. The external resource may be the application 106 installed on the user system 102 (e.g., a "native app"), or a small-scale version of the application (e.g., an "applet") that is hosted on the user system 102 or remote of the user system 102 (e.g., on third-party servers 112). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the interaction client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the interaction client 104 determines whether the selected external resource is a web-based external resource or a locally installed application 106. In some cases, applications 106 that are locally installed on the user system 102 can be launched independently of and separately from the interaction client 104, such as by selecting an icon corresponding to the application 106 on a home screen of the user system 102. Small-scale versions of such applications can be launched or accessed via the interaction client 104 and, in some examples, no or limited portions of the small-scale application can be accessed outside of the interaction client 104. The small-scale application can be launched by the interaction client 104 receiving, from third-party servers 112 for example, a markup-language document associated with the small-scale application and processing such a document. The XR operating system can include such applications that are launched or access external resources, and/or can be installed on such XR operating systems.

System Architecture

Figure 2:
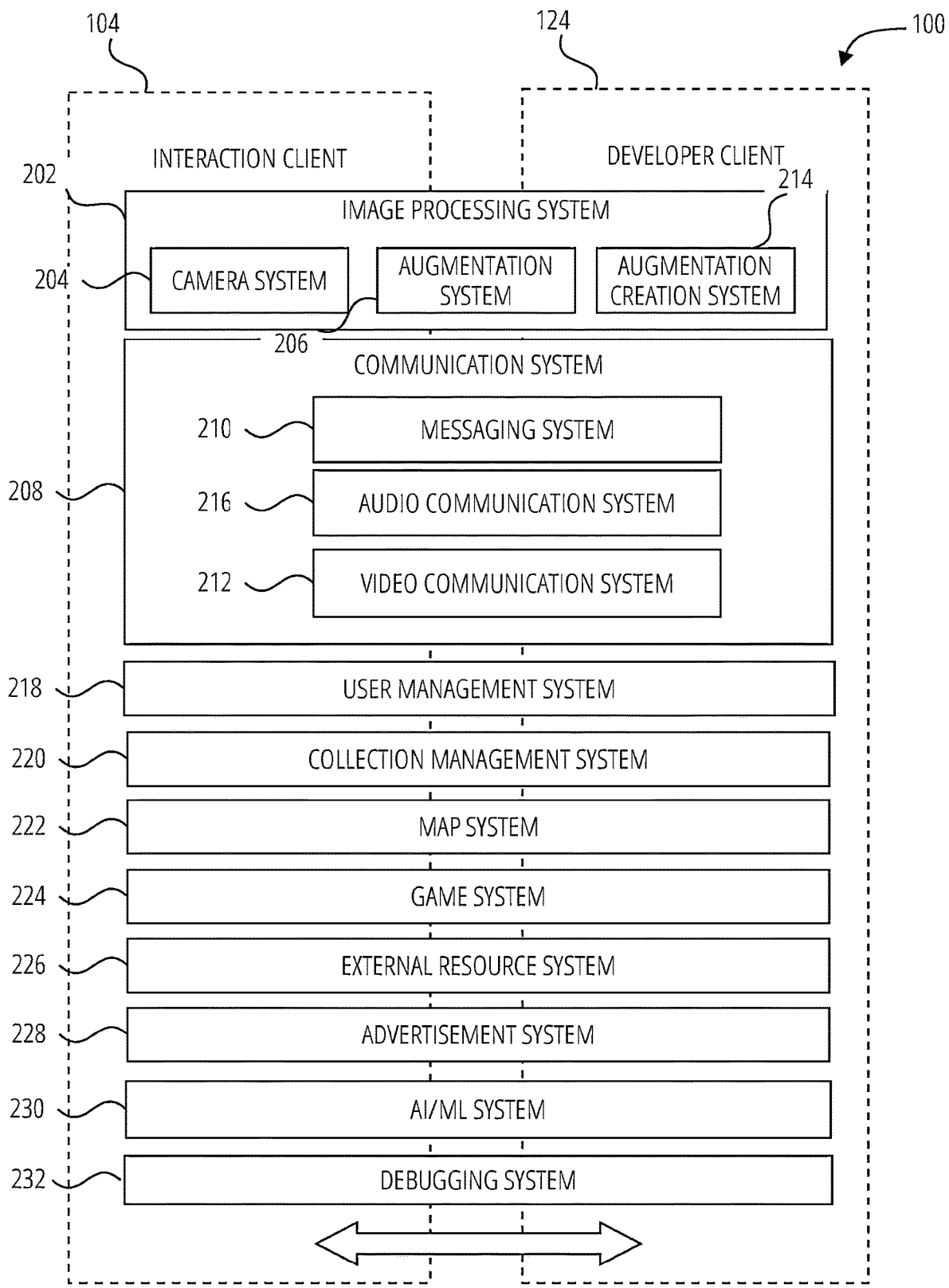
FIG. 2 is a diagrammatic representation of an interaction system that has both client-side and server-side functionality, according to some examples.

FIG. 2 is a block diagram illustrating further details regarding the interaction system 100, according to some examples. Specifically, the interaction system 100 is shown to comprise the interaction client 104 and the developer client 124. The interaction system 100 embodies multiple subsystems, which are supported on the user-side by the interaction client 104 and on the developer-side by the developer client 124. The various systems, processes, and applications described herein can be included in the AR operating system and/or installed on the AR operating system. As such, the methodologies for identifying error originating revisions of such operating systems, applications, systems, and processes can be applied.

In some examples, these subsystems are implemented as microservices. A microservice subsystem (e.g., a microservice application) may have components that enable it to operate independently and communicate with other services. Example components of microservice subsystem may include:

Function logic: The function logic implements the functionality of the microservice subsystem, representing a specific capability or function that the microservice provides.

API interface: Microservices may communicate with each other component through well-defined APIs or interfaces, using lightweight protocols such as REST or messaging. The API interface defines the inputs and outputs of the microservice subsystem and how it interacts with other microservice subsystems of the interaction system 100.

Data storage: A microservice subsystem may be responsible for its own data storage, which may be in the form of a database, cache, or other storage mechanism (e.g., using the database server 126 and database 128). This enables a microservice subsystem to operate independently of other microservices of the interaction system 100.

Service discovery: Microservice subsystems may find and communicate with other microservice subsystems of the interaction system 100. Service discovery mechanisms enable microservice subsystems to locate and communicate with other microservice subsystems in a scalable and efficient way.

Monitoring and logging: Microservice subsystems may need to be monitored and logged in order to ensure availability and performance. Monitoring and logging mechanisms enable the tracking of health and performance of a microservice subsystem.

In some examples, the interaction system 100 may employ a monolithic architecture, a service-oriented architecture (SOA), a function-as-a-service (FaaS) architecture, or a modular architecture:

Example subsystems are discussed below.

An image processing system 202 provides various functions that enable a user to capture and augment (e.g., annotate or otherwise modify or edit) media content associated with a message.

A camera system 204 includes control software (e.g., in a camera application) that interacts with and controls camera hardware (e.g., directly or via operating system controls) of the user system 102 to modify and augment real-time images captured and displayed via the interaction client 104.

The augmentation system 206 provides functions related to the generation and publishing of augmentations (e.g., media overlays) for images captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory 902 of a user system 102. These augmentations are selected by the augmentation system 206 and presented to a user of an interaction client 104, based on a number of inputs and data, such as for example:

Geolocation of the user system 102; and

Entity relationship information of the user of the user system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The augmentation creation system 214 supports XR developer platforms and includes an application for content creators (e.g., artists and developers) to create and publish augmentations (e.g., XR experiences) of the interaction client 104. The augmentation creation system 214 provides a library of built-in features and tools to content creators including, for example custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212. The messaging system 210 is responsible for enforcing the temporary or time-limited access to content by the interaction clients 104. The messaging system 210 incorporates multiple timers (e.g., within an ephemeral timer system) that, based on duration and display parameters associated with a message or collection of messages (e.g., a story), selectively enable access (e.g., for presentation and display) to messages and associated content via the interaction client 104. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

A user management system 218 is operationally responsible for the management of user data and profiles, and maintains entity information (e.g., stored in entity tables 308, entity graphs 310 and profile data 302) regarding users and relationships between users of the interaction system 100.

A collection management system 220 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 220 may also be responsible for publishing an icon that provides notification of a particular collection to the user interface of the interaction client 104. The collection management system 220 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 220 employs machine vision (or image recognition technology) and content rules to curate a content collection automatically. In certain examples, compensation may be paid to a user to include user-generated content into a collection. In such cases, the collection management system 220 operates to automatically make payments to such users to use their content.

A map system 222 provides various geographic location (e.g., geolocation) functions and supports the presentation of map-based media content and messages by the interaction client 104. For example, the map system 222 enables the display of user icons or avatars (e.g., stored in profile data 302) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 224 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 226 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the developer client 124. The SDK includes APIs with functions that can be called or invoked by the web-based application. The developer client 124 hosts a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the developer client 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the developer system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A bridge script running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to developer client 124. The developer client 124 can add a visual representation (such as a box art or other graphic) of the web-based external resource in the interaction client 104. Once the user selects the visual representation or instructs the interaction client 104 through a GUI of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 228 operationally enables the purchasing of advertisements by third parties for presentation to end-users via the interaction clients 104 and also handles the delivery and presentation of these advertisements.

An artificial intelligence and machine learning system 230 provides a variety of services to different subsystems within the interaction system 100. For example, the artificial intelligence and machine learning system 230 operates with the image processing system 202 and the camera system 204 to analyze images and extract information such as objects, text, or faces. This information can then be used by the image processing system 202 to enhance, filter, or manipulate images. The artificial intelligence and machine learning system 230 may be used by the augmentation system 206 to generate augmented content and XR experiences, such as adding virtual objects or animations to real-world images. The communication system 208 and messaging system 210 may use the artificial intelligence and machine learning system 230 to analyze communication patterns and provide insights into how users interact with each other and provide intelligent message classification and tagging, such as categorizing messages based on sentiment or topic. The artificial intelligence and machine learning system 230 may also provide chatbot functionality to message interactions 120 between user systems 102 and between a user system 102 and the developer system 110. The artificial intelligence and machine learning system 230 may also work with the audio communication system 216 to provide speech recognition and natural language processing capabilities, allowing users to interact with the interaction system 100 using voice commands.

A debugging system 232 provides a variety of different debugging services for the developer system. For example, the debugging system 232 allows the developer system to download precompiled versions of the AR operating system, one or more applications installed in the AR operating system, and/or the like. The debugging system 232 retrieves a complete list of revisions, requests the user to select a span of revisions, divides the revisions, such as by dividing the list of revisions, and downloads a precompiled version of the middle revision from a server, such as a cloud storage. The debugging system 232 installs or flashes the downloaded version onto the interaction client. A developer generates a test script on the debugging system 232, and the debugging system 232 either runs the test script or sends the test script onto the interaction client (such as an AR device) for the AR device to send results of the test script back to the debugging system 232.

Data Architecture

Figure 3:
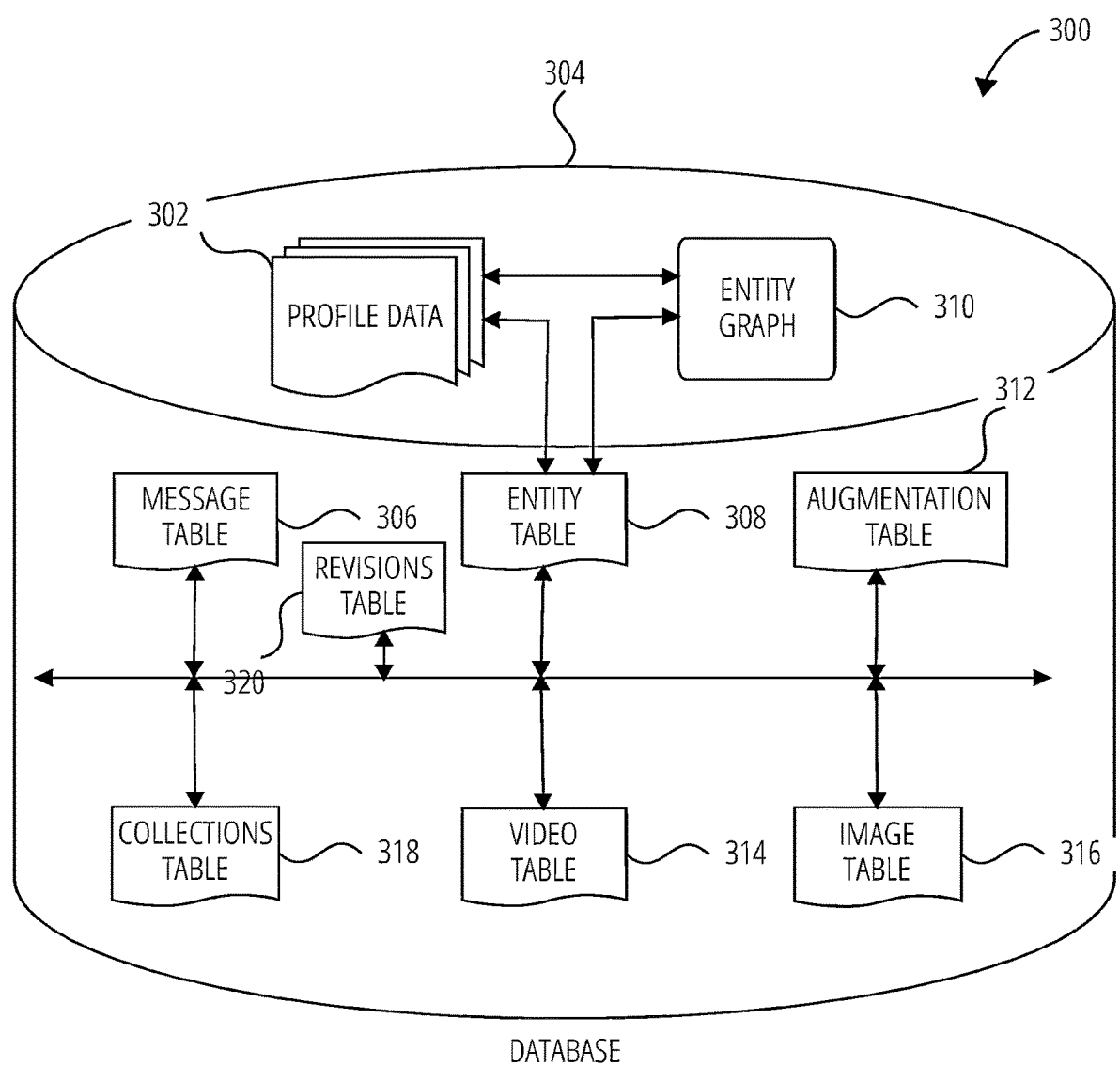
FIG. 3 is a diagrammatic representation of a data structure as maintained in a database, according to some examples.

FIG. 3 is a schematic diagram illustrating data structures 300, which may be stored in the database 304 of the developer system 110 and/or the interaction system 100, according to certain examples. While the content of the database 304 is shown to comprise multiple tables, it will be appreciated that the data could be stored in other types of data structures (e.g., as an object-oriented database). Such data can be relevant as part of the AR operating system, applications installed on the AR operating system, or data used by the AR operating system and/or the applications.

The database 304 includes message data stored within a message table 306. This message data includes, for any particular message, at least message sender data, message recipient (or receiver) data, and a payload. Further details regarding information that may be included in a message and included within the message data stored in the message table 306, are described below with reference to FIG. 3.

An entity table 308 stores entity data, and is linked (e.g., referentially) to an entity graph 310 and profile data 302. Entities for which records are maintained within the entity table 308 may include individuals, corporate entities, organizations, objects, places, events, and so forth. Regardless of entity type, any entity regarding which the developer system 110 stores data may be a recognized entity. Each entity is provided with a unique identifier, as well as an entity type identifier (not shown).

The entity graph 310 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100. A friend relationship can be established by mutual agreement between two entities. This mutual agreement may be established by an offer from a first entity to a second entity to establish a friend relationship, and acceptance by the second entity of the offer for establishment of the friend relationship.

Where the entity is a group, the profile data 302 for the group may similarly include one or more avatar representations associated with the group, in addition to the group name, members, and various settings (e.g., notifications) for the relevant group.

The database 304 also stores augmentation data, such as overlays or filters, in an augmentation table 312. The augmentation data is associated with and applied to videos (for which data is stored in a video table 314) and images (for which data is stored in an image table 316).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 316 includes XR content items (e.g., corresponding to applying "lenses" or augmented reality experiences). An XR content item may be a real-time special effect and sound that may be added to an image or a video.

A collections table 318 stores data regarding collections of messages and associated image, video, or audio data, which are compiled into a collection (e.g., a story or a gallery). The creation of a particular collection may be initiated by a particular user (e.g., each user for which a record is maintained in the entity table 308). A user may create a "personal story" in the form of a collection of content that has been created and sent/broadcast by that user. To this end, the user interface of the interaction client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 104, to contribute content to a particular live story. The live story may be identified to the user by the interaction client 104, based on his or her location. The end result is a "live story" told from a community perspective.

A further type of content collection is known as a "location story," which enables a user whose user system 102 is located within a specific geographic location (e.g., on a college or university campus) to contribute to a particular collection. In some examples, a contribution to a location story may employ a second degree of authentication to verify that the end-user belongs to a specific organization or other entity (e.g., is a student on the university campus).

As mentioned above, the video table 314 stores video data that, in some examples, is associated with messages for which records are maintained within the message table 306. Similarly, the image table 316 stores image data associated with messages for which message data is stored in the entity table 308. The entity table 308 may associate various augmentations from the augmentation table 312 with various images and videos stored in the image table 316 and the video table 314.

The databases 304 also include a revisions table 320. The revisions table 320 stores revisions of the AR operating system and/or applications installed on the AR operating system. The revisions of such systems/applications are precompiled versions to be flashed onto the interaction system 100 and/or source code to be recompiled and flashed onto the interaction system 100.

Identifying an Error Originating Revision

Figure 4:
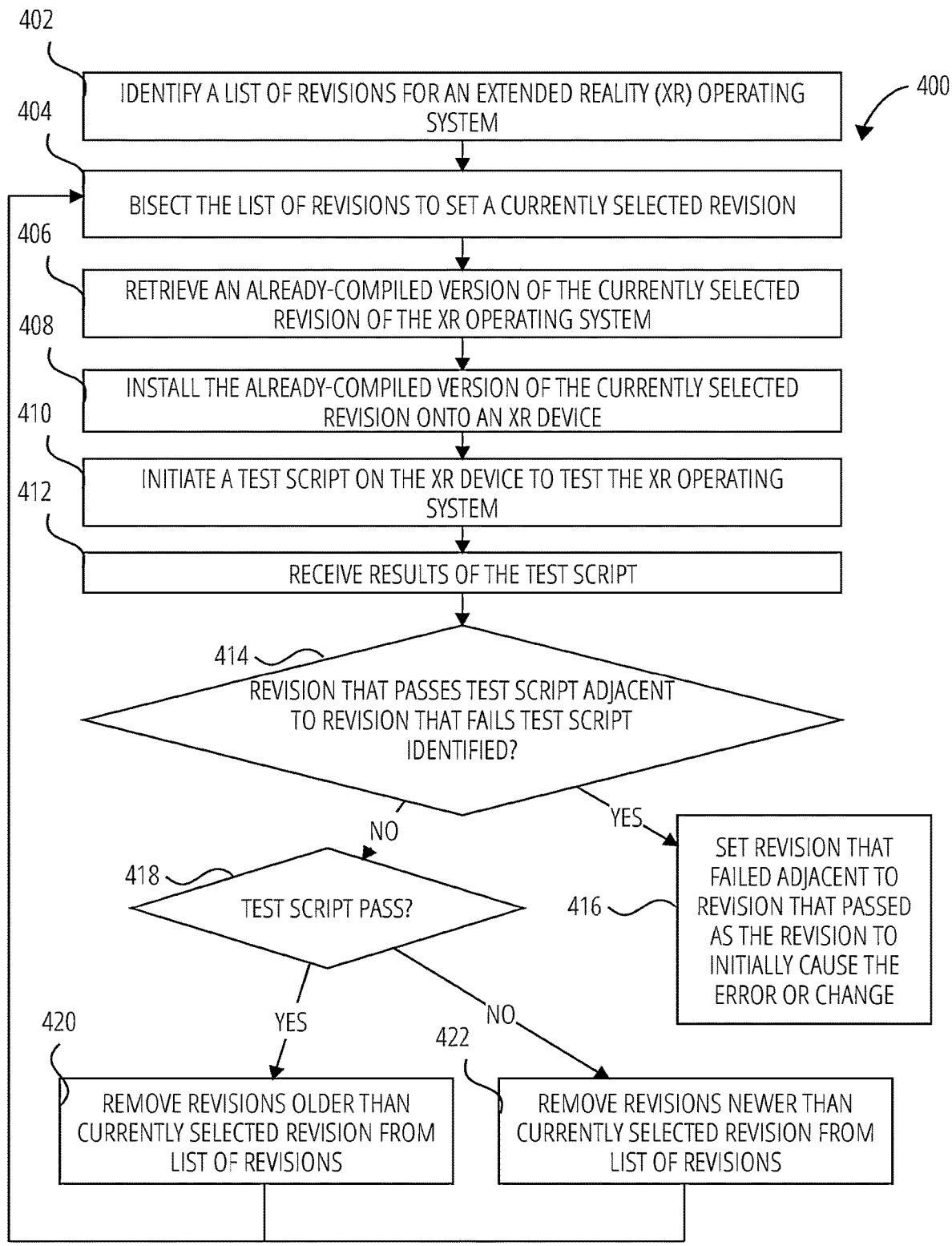
FIG. 4 illustrates an example flowchart for identifying a revision originating a particular error or bug.

FIG. 4 illustrates an example method 400 for identifying a revision originating a particular error or bug, according to some examples. Although the example method 400 depicts a particular sequence of operations, the sequence may be altered without departing from the scope of the present disclosure. For example, some of the operations depicted may be performed in parallel or in a different sequence that does not materially affect the function of method 400. In other examples, different components of an example device or system that implements method 400 may perform functions at substantially the same time or in a specific sequence.

Figure 5:
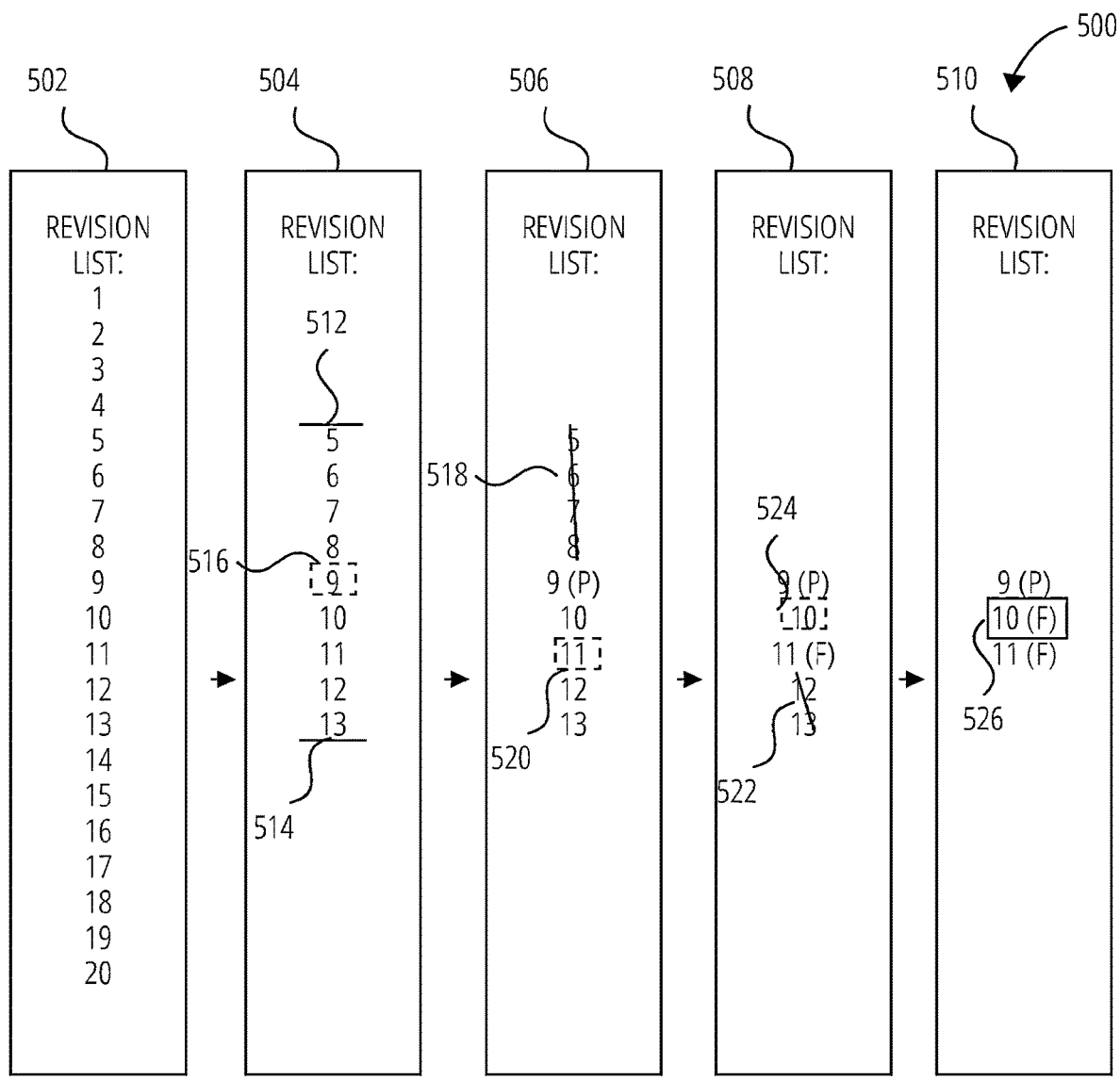
FIG. 5 illustrates a diagram of an example for bisecting the list of revisions.

The method includes identifying a list of revisions for an XR operating system at block 402. The developer system accesses a list of revisions locally or retrieves the list of revisions, such as from a cloud storage. The cloud storage stores the list of revisions and the precompiled versions of the revisions for the AR operating system. FIG. 5 illustrates a diagram 500 of an example for dividing the list of revisions. As shown in the example of FIG. 5, the developer system retrieves a full list 502 of all revisions for the AR operating system.

The developer system receives a full list 502 of all revisions and narrows down the list before proceeding to block 402. In some examples, the developer system and/or the user can select a span of revisions. A span of revisions is a subset of the full list of all revisions that the user selects based on revision number or a time frame. The revisions are in chronological order within the list. As shown in the example of FIG. 5, a developer using the developer system has selected, from the full list of all revisions 502, a narrowed down span (512 and 514) of revisions 5-13 to generate an updated list of revisions 504. Revisions 1-4 and 14-20 were removed from the list 502.

The method includes dividing the list of revisions to set a currently selected revision at block 404. As shown in the example of FIG. 5, the developer system divides the updated list of revisions 504 that include revisions 5-13 to set revision 9 as the currently selected revision 516. In other examples, the developer system divides the revision list using methods such as bisection, trisection, quadrisection, randomization, and/or the like.

The method includes retrieving an already-compiled version of the currently selected revision of the AR operating system at block 406. Corresponding to FIG. 5, the developer system downloads revision 9 of the AR operating system from the cloud storage. In other examples, the developer system already has a local copy of the pre-compiled AR operating system.

The method includes installing the already-compiled version of the currently selected revision onto an AR device at block 408. Corresponding to FIG. 5, the developer system flashes revision 9 of the AR operating system onto the AR device. Flashing an image of the AR operating system onto the AR mobile device 114 includes writing a digital image file containing an operating system or firmware to a storage device, and the storage device is then used to boot, install, and/or update the software or AR operating system on the AR device. The precompiled AR operating system is an image that includes a complete and preconfigured snapshot of a file system that includes the operating system, applications, and/or required settings. Flashing the precompiled AR operating system involves copying the image data onto the AR device's storage in a way that overwrites the existing data, so that the device boots from the newly flashed image.

The precompiled AR operating system includes the entire AR operating system. In some examples, the precompiled AR operating system includes only a portion of the AR operating system. In some examples, the precompiled AR operating system includes the AR operating system with applications already installed, and/or the entire AR operating system with only a portion of the applications installed.

In other examples, other types of installations can be applied, such as network booting which allows a computer to load an operating system over a network connection, USB booting with a live operating system that can be run directly from the USB drive, applying a package manager or software repository to install the AR operating system directly from the internet without having to create a separate installation file on the developer system, containerization technologies to deploy the AR operating system in isolated containers that run on a server without the need to install the AR operating system onto the AR device, and/or the like.

The method includes initiating a test script on the AR device to test the AR operating system at block 410. Corresponding to FIG. 5, the developer system initiates a test script to test revision 9. The test script is written to identify an error present in the latest revision of the AR operating system. In other examples, the test script is written to identify a performance metric and/or battery usage metric, such as a big performance or battery usage change in the AR device.

In some examples, the test script is written to identify errors in the camera system, sensors, calibration system for calibrating between the real world and virtual objects, tracking system responsible for position and orientation of the camera, rendering system for generating and placing virtual objects into the real-world environment, network connectivity, compatibility of hardware and software, processors, lighting conditions, and/or the like.

The method includes receiving results of the test script at block 412. The test script is transmitted from the developer system to the AR device to run on the AR device. The AR device then returns the results of the test script back to the AR device. In other examples, the test script is run on the developer system, where the test script provides inputs to the AR device and the AR device returns the results of the test script.

The results of the test script are a binary result, such as a pass or fail, or a value, such as a performance, battery usage metric, a heat metric, and/or the like. Performance metrics of AR devices include, but are not limited to, a field of view, display resolution, latency, tracking accuracy, battery life, processing power, frame rate, accuracy, heat generation, and/or the like.

The method includes determining whether a revision that passes the test script is adjacent to a revision that fails the test script at block 414. If yes, the revision that failed adjacent to the revision that passed is set as the revision that initially caused the error or change at block 416.

In response to the test script passing at block 418, the developer system removes older revisions than the currently selected revision from the list of revisions at block 420. In response to the test script failing, the developer system removes newer revisions than the currently selected revision from the list of revisions at block 422. As shown in the example of FIG. 5, the developer system determines that revision 9 passed (e.g., "9(P)") and removes revisions 5-8 (518) to establish an updated list of revisions 506.

The developer system divides the updated list of revisions and repeats the process of dividing the updated list, downloading the precompiled versions of the AR operating system, installing the precompiled versions onto the AR device, and running the test script until a revision that passes the test script is adjacent to a revision that fails the test script. As shown in the example of FIG. 5, the developer system divides revisions 9-13 to set revision 11 as the currently selected revision 520. The developer system repeats this process to find revision 11 as failing the test script (e.g., "11(F)"), removes revisions 12-13 (522) from the list of revisions 508, and divides the remaining revisions to set revision 10 as the currently selected revision 524. The developer system repeats this process to find revision 10 as failing the test script (e.g., "10(F)") in the revision list 510.

Once a revision that passes the test script is found to be adjacent to a revision that fails the test script, the repeating ends and the revision that failed adjacent to the revision that passed is set as the revision that initially caused the error or the change in metric at block 416. As shown in the example of FIG. 5, the developer system identifies revision 9 as passing the test script and adjacent to revision 10 that failed the test script. The developer system sets revision 10 as the revision that introduced the error (526).

Advantageously, the developer system at most bisects the list of revisions $\log_2(n)$ times, wherein n is the total number of revisions. The developer system has not downloaded all 20 revisions, but rather only 3 revisions to identify the revision that introduced the error. This is because the developer system retrieves the already-compiled version of the currently selected revision from an external server in response to the setting or resetting of the currently selected revision.

The revision is for an AR operating system. In other examples, the revision is for an application, firmware, data, drivers, plug-ins, libraries, middleware, utilities, and/or the like.

In addition, the developer system can receive input from a cloud server/storage and/or the AR device and process such data on the developer system. Because one or more of the processes of the interaction system can perform on the developer system, remote from the AR device, the processors can analyze large amounts of data, run complexed algorithms/processes (such as downloading and flashing precompiled AR operating systems), and have access to databases that may not be able to be performed on a AR device. Accordingly, this practical application is a technological improvement, as the processing can be performed without being dependent on the hardware, operating system, and/or software of the AR device. Moreover, such processing on the developer side can result in faster processing with more processing power of servers or developer systems, rather than being limited to the processing power of the AR device (such as a mobile phone or laptop).

Architecture for Identifying Erroneous Revisions on an XR Device

Figure 6:
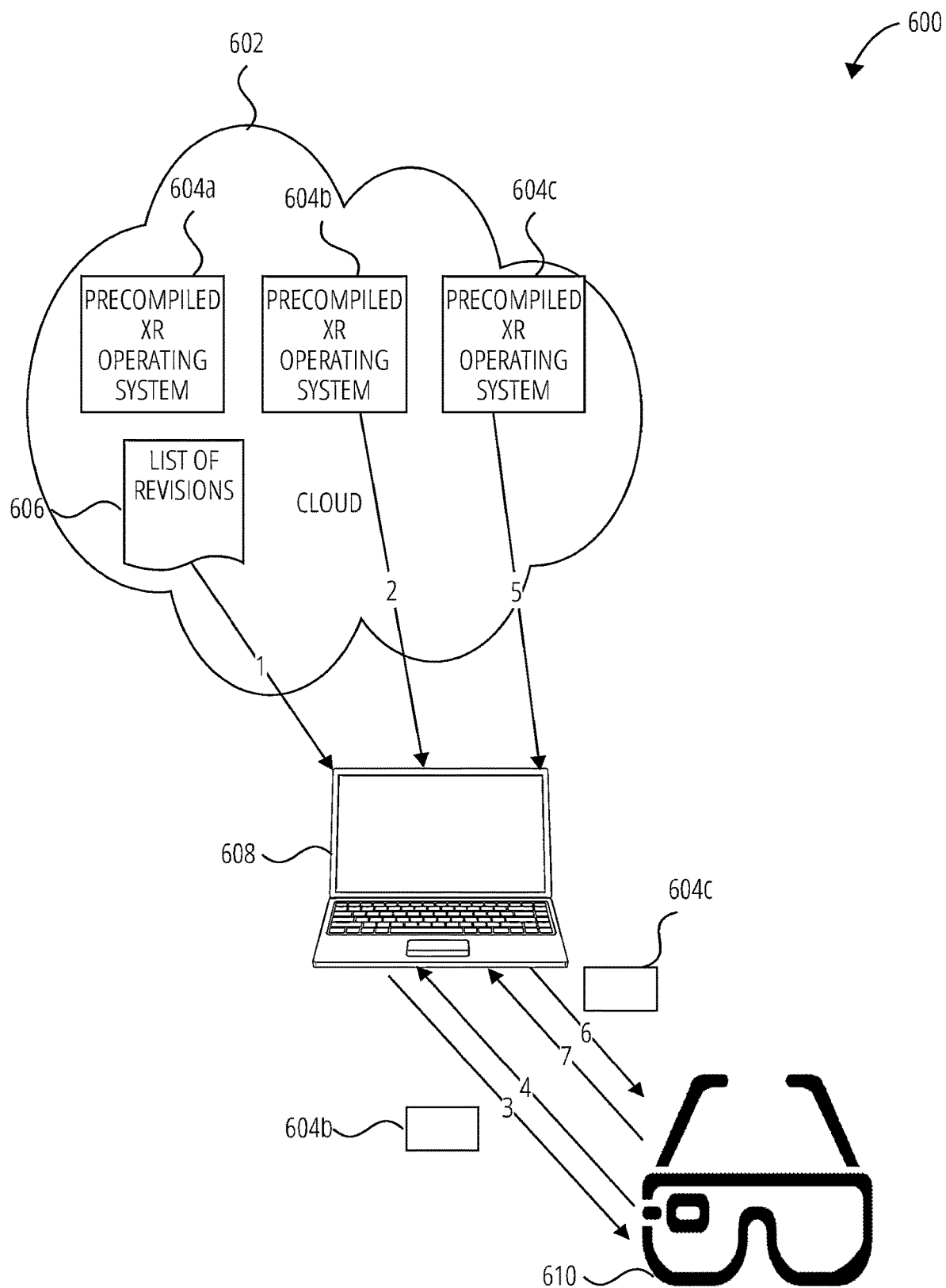
FIG. 6 illustrates an architectural diagram for identifying erroneous revisions on an XR device.

FIG. 6 illustrates an architectural diagram 600 for identifying erroneous revisions on an AR device. A developer system 608 accesses a list of revisions 606 at step 1. In some examples, the developer system 608 downloads a full list of revisions 606 from cloud storage 602. The developer system 608 receives from a user a span of revisions and the developer system 608 creates a subset of the full list of revisions. The developer system 608 bisects the subset of revisions where the revisions are listed in chronological order to select a currently selected revision.

Extended Reality (XR) is an umbrella term encapsulating Augmented Reality (AR), Virtual Reality (VR), Mixed Reality (MR), and everything in between. For the sake of simplicity, examples are described using one type of system, such as XR or AR. However it is appreciated that other types of systems apply.

The developer system downloads a precompiled XR operating system 604a (from a group of Precompiled XR operating systems 604a, 604b, and 604c) that corresponds to the currently selected revision. The developer system flashes the precompiled XR operating system 604a onto the XR device 610 at step 3. The developer system initiates a test script to be run on the XR device that returns the results of the test script at step 4 (such as a pass/fail, or a measured metric of the XR device). The developer system removes certain lists of revisions, such as newer revisions of the currently selected revision if the test script passes or older revisions if the test script fails, and bisects the updated list to reset the currently selected revision.

The developer system downloads a precompiled XR operating system 604c that corresponds to the reset currently selected revision. The developer system repeats to flash the downloaded XR operating system at step 7, initiates a test script, and receives the results at step 6. Advantageously, the developer system obviates downloading of the precompiled XR operating system 604a, does not have to recompile the XR operating system locally, and identifies revisions that originated the bug quickly.

Figure 7:
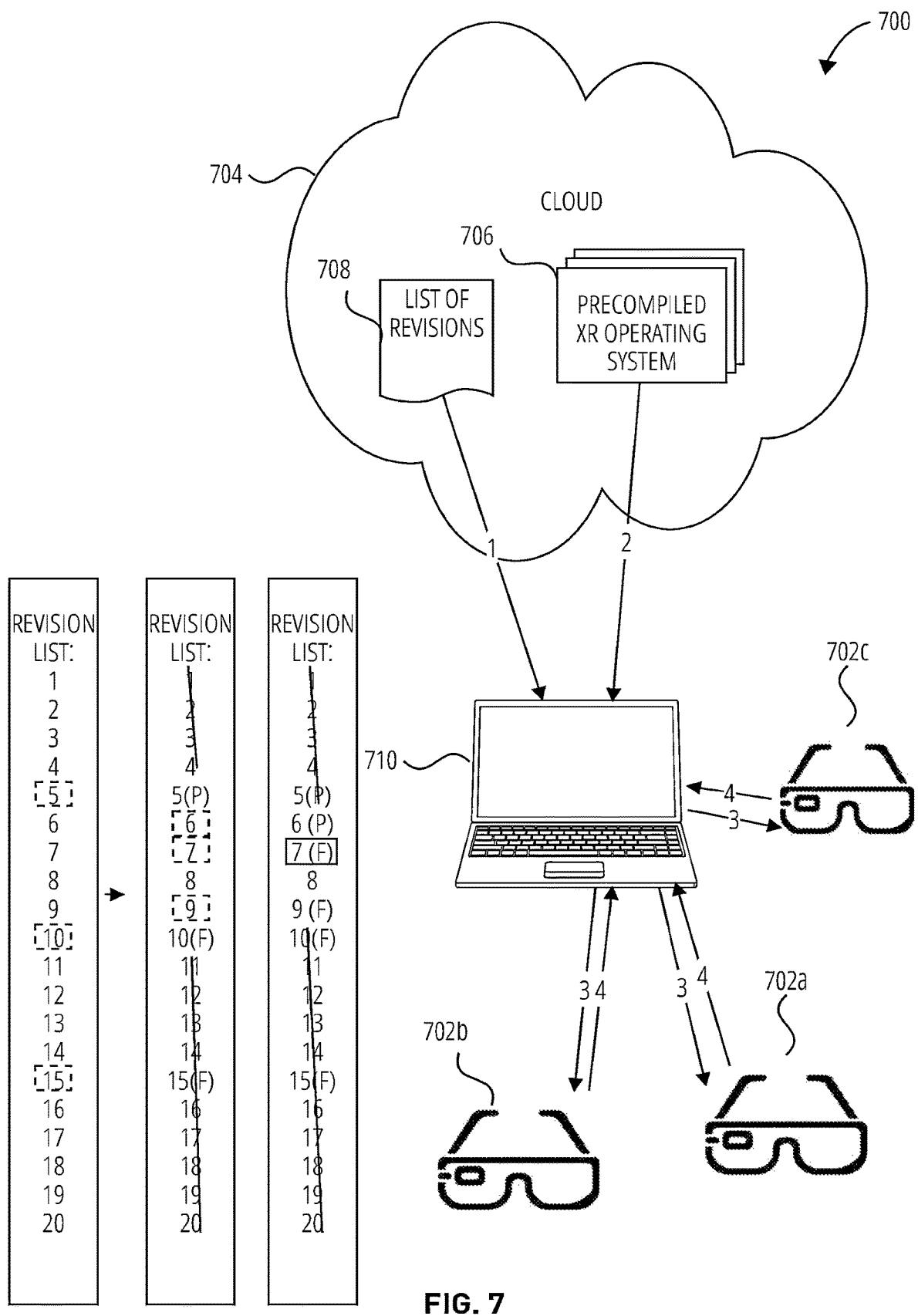
FIG. 7 illustrates an architectural diagram for identifying erroneous revisions on an XR device using multiple bisections in parallel, according to some examples.

FIG. 7 illustrates an architectural diagram 700 for identifying erroneous revisions on an XR device using multiple bisections in parallel, according to some examples. A developer system 710 accesses a list of revisions 708 at step 1 from the cloud database 704. The developer system 710 bisects the revisions where the revisions are listed in chronological order and then bisects again each of the two lists in order to select three currently selected revisions.

The developer system downloads precompiled XR operating systems 706 that correspond to the currently selected revisions. The developer system flashes the precompiled XR operating systems 706 onto individual XR devices 702a, 702b, and 702c at step 3. The developer system initiates a test script to be run on the XR devices that returns the results of the test script at step 4 (such as a pass/fail, or a measured metric of the XR device).

The developer system removes revisions 1-4 and 11-20 from the list. The developer system then repeats parallel bisection and tests revisions 6, 7, and 9, and identifies revision 7 as the revision that introduced the error. With multiple XR devices to test, the test cycle can be dramatically reduced.

Data Communications Architecture

Figure 8:
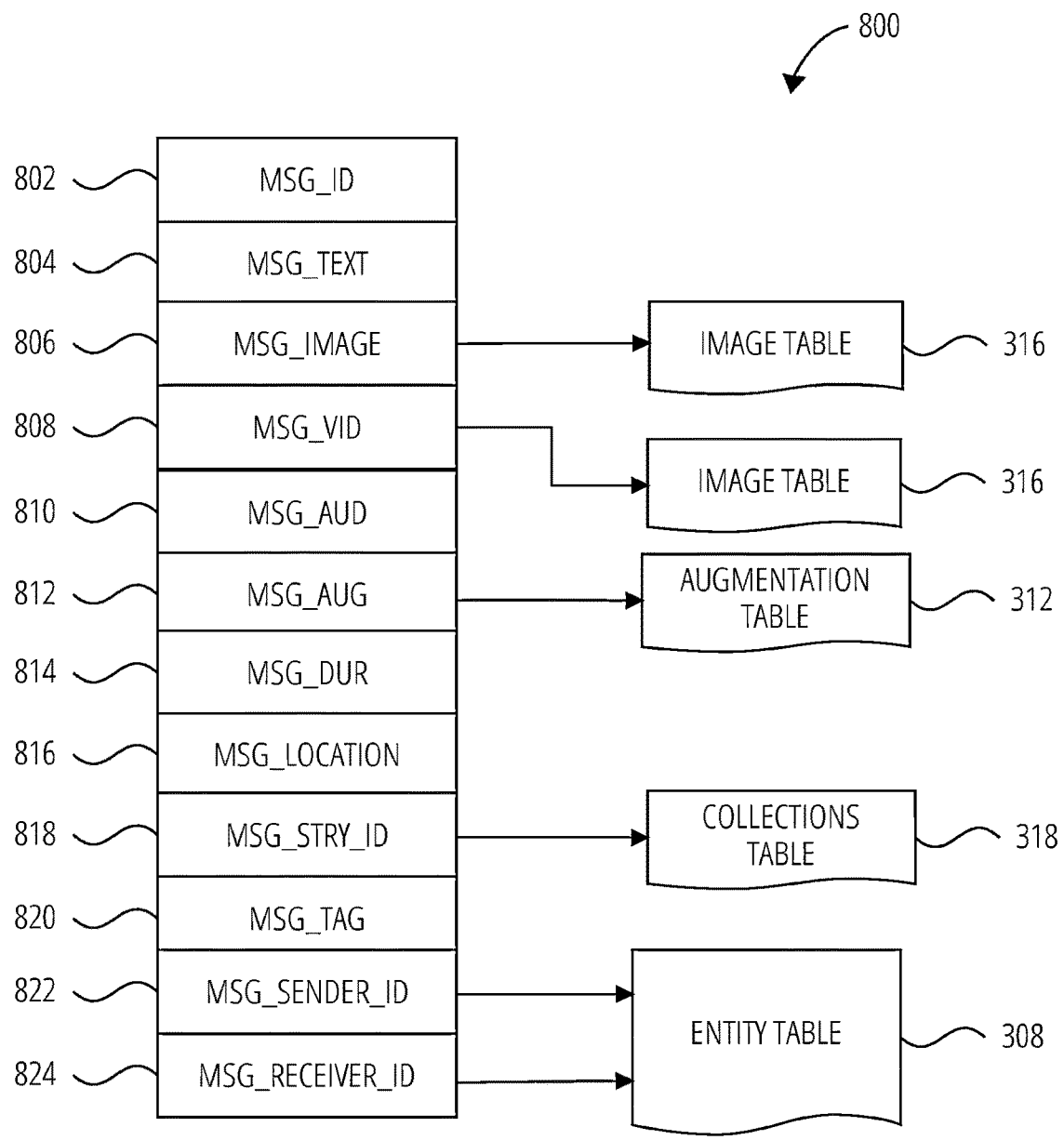
FIG. 8 is a diagrammatic representation of a message, according to some examples.

FIG. 8 is a schematic diagram illustrating a structure of a message 800, according to some examples, generated by an interaction client 104 for communication to a further interaction client 104 or the developer client 124, and/or vice versa. Such a message can include portions of an application, an operating system, and/or the like. The content of a particular message 800 is used to populate the message table 306 stored within the database 304, accessible by the developer client 124. Similarly, the content of a message 800 is stored in memory as "in-transit" or "in-flight" data of the user system 102 or the developer client 124. A message 800 is shown to include the following example components:

Message identifier 802: a unique identifier that identifies the message 800.

Message text payload 804: text, to be generated by a user via a user interface of the user system 102, and that is included in the message 800.

Message image payload 806: image data, captured by a camera component of a user system 102 or retrieved from a memory component of a user system 102, and that is included in the message 800. Image data for a sent or received message 800 may be stored in the image table 316.

Message video payload 808: video data, captured by a camera component or retrieved from a memory component of the user system 102, and that is included in the message 800. Video data for a sent or received message 800 may be stored in the image table 316.

Message audio payload 810: audio data, captured by a microphone or retrieved from a memory component of the user system 102, and that is included in the message 800.

Message augmentation data 812: augmentation data (e.g., filters, stickers, or other annotations or enhancements) that represents augmentations to be applied to message image payload 806, message video payload 808, or message audio payload 810 of the message 800. Augmentation data for a sent or received message 800 may be stored in the augmentation table 312.

Message duration parameter 814: parameter value indicating, in seconds, the amount of time for which content of the message (e.g., the message image payload 806, message video payload 808, message audio payload 810) is to be presented or made accessible to a user via the interaction client 104.

Message geolocation parameter 816: geolocation data (e.g., latitudinal and longitudinal coordinates) associated with the content payload of the message. Multiple message geolocation parameter 816 values may be included in the payload, each of these parameter values being associated with respect to content items included in the content (e.g., a specific image within the message image payload 806, or a specific video in the message video payload 808).

Message story identifier 818: identifier values identifying one or more content collections (e.g., "stories" identified in the collections table 318) with which a particular content item in the message image payload 806 of the message 800 is associated. For example, multiple images within the message image payload 806 may each be associated with multiple content collections using identifier values.

Message tag 820: each message 800 may be tagged with multiple tags, each of which is indicative of the subject matter of content included in the message payload. For example, where a particular image included in the message image payload 806 depicts an animal (e.g., a lion), a tag value may be included within the message tag 820 that is indicative of the relevant animal. Tag values may be generated manually, based on user input, or may be automatically generated using, for example, image recognition.

Message sender identifier 822: an identifier (e.g., a messaging system identifier, email address, or device identifier) indicative of a user of the user system 102 on which the message 800 was generated and from which the message 800 was sent.

Message receiver identifier 824: an identifier (e.g., a messaging system identifier, email address, or device identifier) indicative of a user of the user system 102 to which the message 800 is addressed.

The contents (e.g., values) of the various components of message 800 may be pointers to locations in tables within which content data values are stored. For example, an image value in the message image payload 806 may be a pointer to (or address of) a location within an image table 316. Similarly, values within the message video payload 808 may point to data stored within an image or video table 316, values stored within the message augmentation data 812 may point to data stored in an augmentation table 312, values stored within the message story identifier 818 may point to data stored in a collections table 318, and values stored within the message sender identifier 822 and the message receiver identifier 824 may point to user records stored within an entity table 308.

System With Head-Wearable Apparatus

Figure 9:
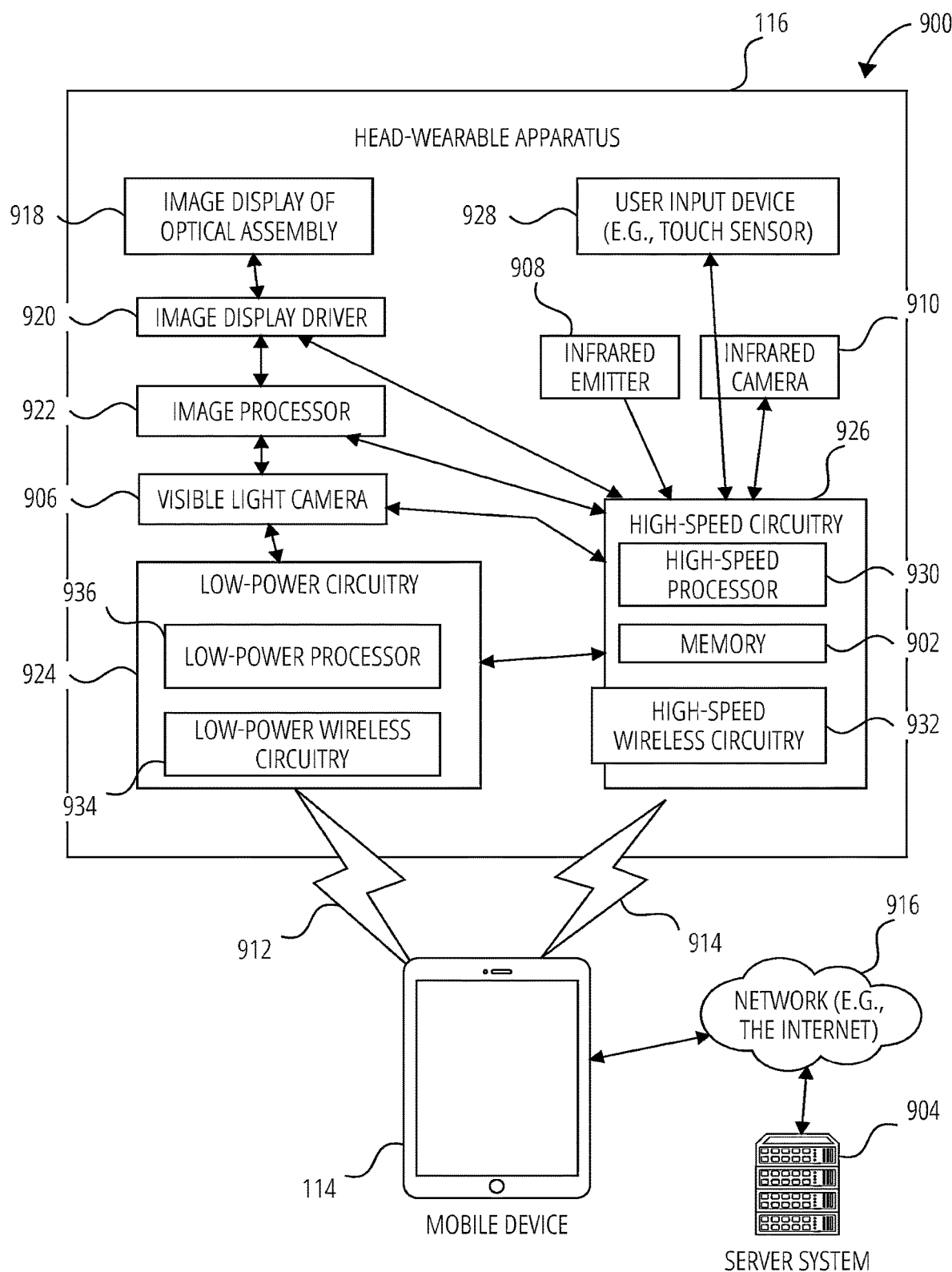
FIG. 9 illustrates a head-wearable apparatus, according to some examples.

FIG. 9 illustrates a system 900 including a head-wearable apparatus 116 with a selector input device, according to some examples. FIG. 9 is a high-level functional block diagram of an example head-wearable apparatus 116 communicatively coupled to a mobile device 114 and various systems (e.g., the developer systems 110) via various networks 108. The networks 108 may include any combination of wired and wireless connections.

The head-wearable apparatus 116 includes one or more cameras, each of which may be, for example, a visible light camera 906, an infrared emitter 908, and an infrared camera 910.

An interaction client, such as a mobile device 114 connects with head-wearable apparatus 116 using both a low-power wireless connection 912 and a high-speed wireless connection 914. The mobile device 114 is also connected to the server system 904 and the network 916.

The head-wearable apparatus 116 further includes two image displays of the image display of optical assembly 918. The two image displays of optical assembly 918 include one associated with the left lateral side and one associated with the right lateral side of the head-wearable apparatus 116. The head-wearable apparatus 116 also includes an image display driver 920, an image processor 922, low-power circuitry 924, and high-speed circuitry 926. The image display of optical assembly 918 is for presenting images and videos, including an image that can include a graphical user interface to a user of the head-wearable apparatus 116.

The image display driver 920 commands and controls the image display of optical assembly 918. The image display driver 920 may deliver image data directly to the image display of optical assembly 918 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 116 includes a frame and stems (or temples) extending from a lateral side of the frame. The head-wearable apparatus 116 further includes a user input device 928 (e.g., touch sensor or push button), including an input surface on the head-wearable apparatus 116. The user input device 928 (e.g., touch sensor or push button) is to receive from the user an input selection to manipulate the graphical user interface of the presented image.

The components shown in FIG. 9 for the head-wearable apparatus 116 are located on one or more circuit boards, for example a PCB or flexible PCB, in the rims or temples. Alternatively, or additionally, the depicted components can be located in the chunks, frames, hinges, or bridge of the head-wearable apparatus 116. Left and right visible light cameras 906 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 116 includes a memory 902, which stores instructions to perform a subset or all of the functions described herein. The memory 902 can also include storage device.

As shown in FIG. 9, the high-speed circuitry 926 includes a high-speed processor 930, a memory 902, and high-speed wireless circuitry 932. In some examples, the image display driver 920 is coupled to the high-speed circuitry 926 and operated by the high-speed processor 930 in order to drive the left and right image displays of the image display of optical assembly 918. The high-speed processor 930 may be any processor capable of managing high-speed communications and operation of any general computing system needed for the head-wearable apparatus 116. The high-speed processor 930 includes processing resources needed for managing high-speed data transfers on a high-speed wireless connection 914 to a wireless local area network (WLAN)

using the high-speed wireless circuitry 932. In certain examples, the high-speed processor 930 executes an operating system such as a LINUX operating system or other such operating system of the head-wearable apparatus 116, and the operating system is stored in the memory 902 for execution. In addition to any other responsibilities, the high-speed processor 930 executing a software architecture for the head-wearable apparatus 116 is used to manage data transfers with high-speed wireless circuitry 932. In certain examples, the high-speed wireless circuitry 932 is configured to implement Institute of Electrical and Electronic Engineers (IEEE) 802.11 communication standards, also referred to herein as WI-FI®. In some examples, other high-speed communications standards may be implemented by the high-speed wireless circuitry 932.

The low-power wireless circuitry 934 and the high-speed wireless circuitry 932 of the head-wearable apparatus 116 can include short-range transceivers (Bluetooth™) and wireless wide, local, or wide area network transceivers (e.g., cellular or WI-FI®). Mobile device 114, including the transceivers communicating via the low-power wireless connection 912 and the high-speed wireless connection 914, may be implemented using details of the architecture of the head-wearable apparatus 116, as can other elements of the network 916.

The memory 902 includes any storage device capable of storing various data and applications, including, among other things, camera data generated by the left and right visible light cameras 906, the infrared camera 910, and the image processor 922, as well as images generated for display by the image display driver 920 on the image displays of the image display of optical assembly 918. While the memory 902 is shown as integrated with high-speed circuitry 926, in some examples, the memory 902 may be an independent standalone element of the head-wearable apparatus 116. In certain such examples, electrical routing lines may provide a connection through a chip that includes the high-speed processor 930 from the image processor 922 or the low-power processor 936 to the memory 902. In some examples, the high-speed processor 930 may manage addressing of the memory 902 such that the low-power processor 936 will boot the high-speed processor 930 any time that a read or write operation involving memory 902 is needed.

As shown in FIG. 9, the low-power processor 936 or high-speed processor 930 of the head-wearable apparatus 116 can be coupled to the camera (visible light camera 906, infrared emitter 908, or infrared camera 910), the image display driver 920, the user input device 928 (e.g., touch sensor or push button), and the memory 902.

The head-wearable apparatus 116 is connected to a host computer. For example, the head-wearable apparatus 116 is paired with the mobile device 114 via the high-speed wireless connection 914 or connected to the server system 904 via the network 916. The server system 904 may be one or more computing devices as part of a service or network computing system, for example, that includes a processor, a memory, and network communication interface to communicate over the network 916 with the mobile device 114 and the head-wearable apparatus 116.

The mobile device 114 includes a processor and a network communication interface coupled to the processor. The network communication interface allows for communication over the network 916, low-power wireless connection 912, or high-speed wireless connection 914. Mobile device 114 can further store at least portions of the instructions for generating binaural audio content in the mobile device 114's memory to implement the functionality described herein.

Output components of the head-wearable apparatus 116 include visual components, such as a display such as a liquid crystal display (LCD), a plasma display panel (PDP), a light-emitting diode (LED) display, a projector, or a waveguide. The image displays of the optical assembly are driven by the image display driver 920. The output components of the head-wearable apparatus 116 further include acoustic components (e.g., speakers), haptic components (e.g., a vibratory motor), other signal generators, and so forth. The input components of the head-wearable apparatus 116, the mobile device 114, and server system 904, such as the user input device 928, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 116 may also include additional peripheral device elements. Such peripheral device elements may include biometric sensors, additional sensors, or display elements integrated with the head-wearable apparatus 116. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like.

The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 912 and high-speed wireless connection 914 from the mobile device 114 via the low-power wireless circuitry 934 or high-speed wireless circuitry 932.

Machine Architecture

Figure 10:
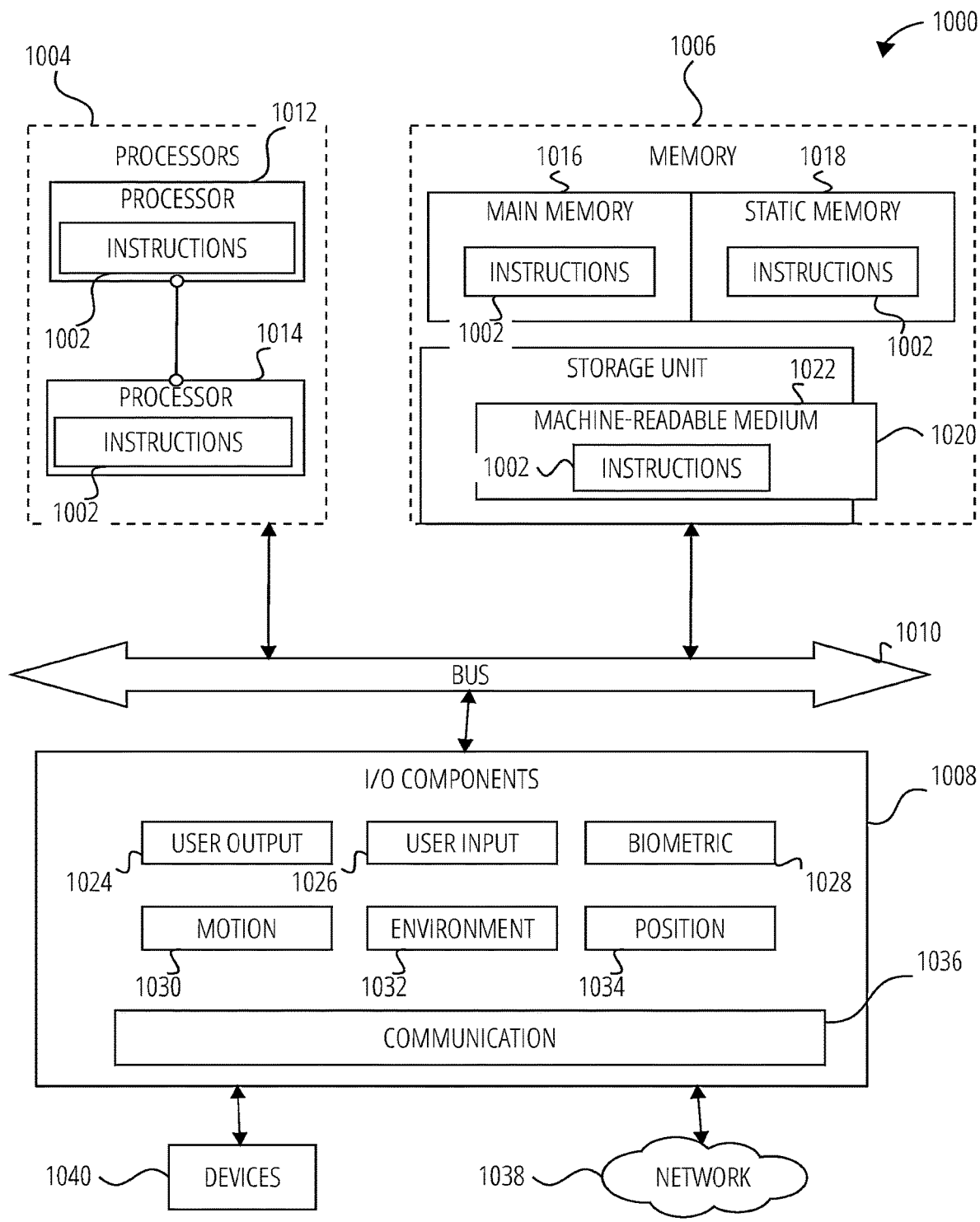
FIG. 10 is a diagrammatic representation of a machine in the form of a computer system within which a set of instructions may be executed to cause the machine to perform any one or more of the methodologies discussed herein, according to some examples.

FIG. 10 is a diagrammatic representation of the machine 1000 within which instructions 1002 (e.g., software, a program, an application, an applet, an app, or other executable code) for causing the machine 1000 to perform any one or more of the methodologies discussed herein may be executed. For example, the instructions 1002 may cause the machine 1000 to execute any one or more of the methods described herein. The instructions 1002 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1002, sequentially or otherwise, that specify actions to be taken by the machine 1000. Further, while a single machine 1000 is illustrated, the term "machine" shall also be taken to include a collection of machines that individually or jointly execute the instructions 1002 to perform any one or more of the methodologies discussed herein. The machine 1000, for example, may comprise the user system 102 or any one of multiple server devices forming part of the developer systems 110. In some examples, the machine 1000 may also comprise both client and server systems, with certain operations of a particular method or algorithm being performed on the server-side and with certain operations of the particular method or algorithm being performed on the client-side.

The machine 1000 may include processors 1004, memory 1006, and input/output I/O components 1008, which may be configured to communicate with each other via a bus 1010. In an example, the processors 1004 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1012 and a processor 1014 that execute the instructions 1002. The term "processor" is intended to include multi-core processors that may comprise two or more independent processors (sometimes referred to as "cores") that may execute instructions contemporaneously. Although FIG. 10 shows multiple processors 1004, the machine 1000 may include a single processor with a single-core, a single processor with multiple cores (e.g., a multi-core processor), multiple processors with a single core, multiple processors with multiples cores, or any combination thereof.

The memory 1006 includes a main memory 1016, a static memory 1018, and a storage unit 1020, both accessible to the processors 1004 via the bus 1010. The main memory 1006, the static memory 1018, and storage unit 1020 store the instructions 1002 embodying any one or more of the methodologies or functions described herein. The instructions 1002 may also reside, completely or partially, within the main memory 1016, within the static memory 1018, within machine-readable medium 1022 within the storage unit 1020, within at least one of the processors 1004 (e.g., within the processor's cache memory), or any suitable combination thereof, during execution thereof by the machine 1000.

The I/O components 1008 may include a wide variety of components to receive input, provide output, produce output, transmit information, exchange information, capture measurements, and so on. The specific I/O components 1008 that are included in a particular machine will depend on the type of machine. For example, portable machines such as mobile phones may include a touch input device or other such input mechanisms, while a headless server machine will likely not include such a touch input device. It will be appreciated that the I/O components 1008 may include many other components that are not shown in FIG. 10. In various examples, the I/O components 1008 may include user output components 1024 and user input components 1026. The user output components 1024 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1026 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1008 may include biometric components 1028, motion components 1030, environmental components 1032, or position components 1034, among a wide array of other components. For example, the biometric components 1028 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like.

The motion components 1030 include acceleration sensor components (e.g., accelerometer), gravitation sensor components, and rotation sensor components (e.g., gyroscope).

The environmental components 1032 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gasses for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple cameras systems may include a wide camera, an ultra-wide camera, a telephoto camera, a macro camera, and a depth sensor, for example.

The position components 1034 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1008 further include communication components 1036 operable to couple the machine 1000 to a network 1038 or devices 1040 via respective coupling or connections. For example, the communication components 1036 may include a network interface component or another suitable device to interface with the network 1038. In further examples, the communication components 1036 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1040 may be another machine or any of a wide variety of peripheral devices (e.g., a peripheral device coupled via a USB).

Moreover, the communication components 1036 may detect identifiers or include components operable to detect identifiers. For example, the communication components 1036 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 1036, such as location via Internet Protocol (IP) geolocation, location via Wi-Fi® signal triangulation, location via detecting an NFC beacon signal that may indicate a particular location, and so forth.

The various memories (e.g., main memory 1016, static memory 1018, and memory of the processors 1004) and storage unit 1020 may store one or more sets of instructions and data structures (e.g., software) embodying or used by any one or more of the methodologies or functions described herein. These instructions (e.g., the instructions 1002), when executed by processors 1004, cause various operations to implement the disclosed examples.

The instructions 1002 may be transmitted or received over the network 1038, using a transmission medium, via a network interface device (e.g., a network interface component included in the communication components 1036) and using any one of several well-known transfer protocols (e.g., hypertext transfer protocol (HTTP)). Similarly, the instructions 1002 may be transmitted or received using a transmission medium via a coupling (e.g., a peer-to-peer coupling) to the devices 1040.

Software Architecture

Figure 11:
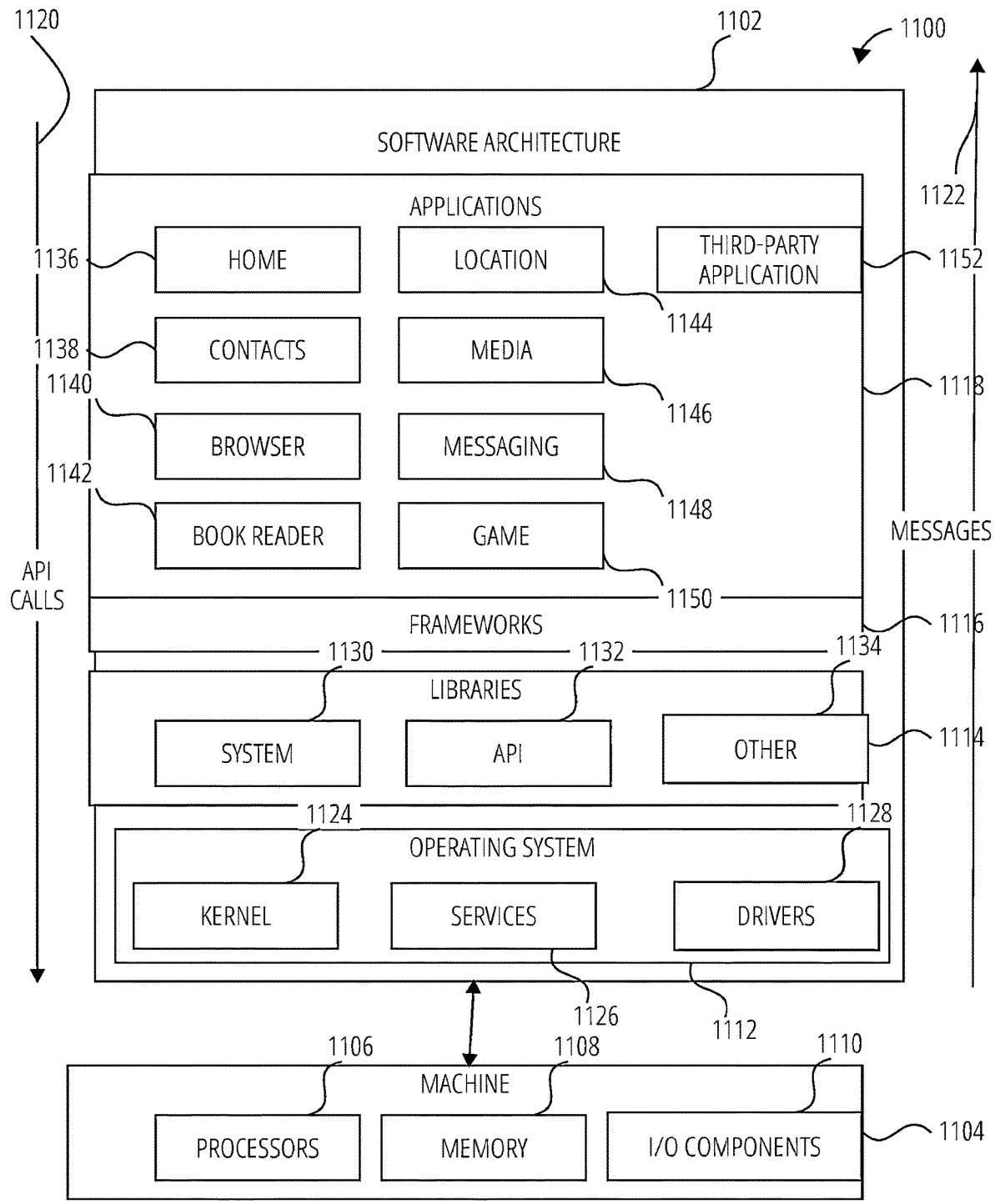
FIG. 11 is a block diagram showing a software architecture within which examples may be implemented.

FIG. 11 is a block diagram 1100 illustrating a software architecture 1102, which can be installed on any one or more of the devices described herein. The software architecture 1102 is supported by hardware such as a machine 1104 that includes processors 1106, memory 1108, and I/O components 1110. In this example, the software architecture 1102 can be conceptualized as a stack of layers, where each layer provides a particular functionality. The software architecture 1102 includes layers such as an operating system 1112, libraries 1114, frameworks 1116, and applications 1118. Operationally, the applications 1118 invoke API calls 1120 through the software stack and receive messages 1122 in response to the API calls 1120.

The operating system 1112 manages hardware resources and provides common services. The operating system 1112 includes, for example, a kernel 1124, services 1126, and drivers 1128. The kernel 1124 acts as an abstraction layer between the hardware and the other software layers. For example, the kernel 1124 provides memory management, processor management (e.g., scheduling), component management, networking, and security settings, among other functionalities. The services 1126 can provide other common services for the other software layers. The drivers 1128 are responsible for controlling or interfacing with the underlying hardware. For instance, the drivers 1128 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1114 provide a common low-level infrastructure used by the applications 1118. The libraries 1114 can include system libraries 1130 (e.g., C standard library) that provide functions such as memory allocation functions, string manipulation functions, mathematic functions, and the like. In addition, the libraries 1114 can include API libraries 1132 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1114 can also include a wide variety of other libraries 1134 to provide many other APIs to the applications 1118.

The frameworks 1116 provide a common high-level infrastructure that is used by the applications 1118. For example, the frameworks 1116 provide various graphical user interface (GUI) functions, high-level resource management, and high-level location services. The frameworks 1116 can provide a broad spectrum of other APIs that can be used by the applications 1118, some of which may be specific to a particular operating system or platform.

In an example, the applications 1118 may include a home application 1136, a contacts application 1138, a browser application 1140, a book reader application 1142, a location application 1144, a media application 1146, a messaging application 1148, a game application 1150, and a broad assortment of other applications such as a third-party application 1152. The applications 1118 are programs that execute functions defined in the programs. Various programming languages can be employed to create one or more of the applications 1118, structured in a variety of manners, such as object-oriented programming languages (e.g., Objective-C, Java, or C++) or procedural programming languages (e.g., C or assembly language). In a specific example, the third-party application 1152 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1152 can invoke the API calls 1120 provided by the operating system 1112 to facilitate functionalities described herein.

Example 1 is a system comprising: at least one processor; and at least one memory component storing instructions that, when executed by the at least one processor, cause the at least one processor to perform operations comprising: identifying a list of revisions for an Extended Reality (XR) operating system; performing a set of testing operations comprising: dividing the list of revisions to set a currently selected revision of the XR operating system; retrieving an already-compiled version of the currently selected revision of the AR operating system; installing the already-compiled version of the currently selected revision on an AR device; initiating a test script for the AR device to test the AR operating system; receiving results of the test script; and updating the list of revisions based on the received results of the test script; and repeating the set of testing operations until a stopping criterion is satisfied.

In Example 2, the subject matter of Example 1 includes, wherein updating the list of revisions comprises: in response to the test script passing, removing older revisions than the currently selected revision from the list of revisions.

In Example 3, the subject matter of Example 2 includes, wherein updating the list of revisions comprises: in response to the test script failing, removing newer revisions than the currently selected revision from the list of revisions.

In Example 4, the subject matter of Examples 1-3 includes, wherein updating the list of revisions comprises: in response to the test script failing, removing newer revisions than the currently selected revision from the list of revisions.

In Example 5, the subject matter of Examples 1-4 includes, (n) times, wherein n is the total number of revisions.

In Example 6, the subject matter of Examples 1-5 includes, wherein the system does not retrieve already-compiled versions of revisions that are not set as the currently selected revision.

In Example 7, the subject matter of Examples 1-6 includes, wherein the already-compiled version of the currently selected revision comprises the entire AR operating system.

In Example 8, the subject matter of Examples 1-7 includes, wherein the already-compiled version of the currently selected revision comprises only a portion of the AR operating system.

In Example 9, the subject matter of Examples 1-8 includes, wherein the operations further comprise: receiving, from a user of the system, a span of revisions; and removing revisions that are not included in the span of revisions from the list of revisions.

In Example 10, the subject matter of Example 9 includes, wherein receiving the span of revisions comprises receiving a selection of a time frame.

In Example 11, the subject matter of Examples 1-10 includes, wherein the list of revisions is in chronological order.

In Example 12, the subject matter of Examples 1-11 includes, wherein the test script is configured to identify an error present in a latest revision of the AR operating system, wherein the test script is configured to run on revisions other than the latest revision.

In Example 13, the subject matter of Examples 1-12 includes, wherein the test script is configured to detect a performance metric or a battery usage metric.

In Example 14, the subject matter of Examples 1-13 includes, wherein the test script is transmitted to the AR device, and the AR device is configured to run the test script locally.

In Example 15, the subject matter of Examples 1-14 includes, wherein the test script is run on the system, wherein the test script initiates input to be sent to the AR device.

In Example 16, the subject matter of Examples 1-15 includes, wherein installing the already-compiled version includes flashing the already-compiled version onto the AR device.

In Example 17, the subject matter of Examples 1-16 includes, wherein dividing the list of revisions to set the currently selected revision comprises bisecting the list of revisions.

In Example 18, the subject matter of Examples 1-17 includes, wherein the stopping criterion includes determining that a revision that passes the test script is found to be adjacent to a revision that fails the test script.

Example 19 is a method comprising: identifying a list of revisions for an Extended Reality (XR) operating system; performing a set of testing operations comprising: dividing the list of revisions to set a currently selected revision of the XR operating system; retrieving an already-compiled version of the currently selected revision of the AR operating system; installing the already-compiled version of the currently selected revision on an AR device; initiating a test script for the AR device to test the AR operating system; receiving results of the test script; and updating the list of revisions based on the received results of the test script; and repeating the set of testing operations until a stopping criterion is satisfied.

Example 20 is a non-transitory computer-readable storage medium storing instructions that, when executed by at least one processor, cause the at least one processor to perform operations comprising: identifying a list of revisions for an Extended Reality (XR) operating system; performing a set of testing operations comprising: dividing the list of revisions to set a currently selected revision of the XR operating system; retrieving an already-compiled version of the currently selected revision of the AR operating system; installing the already-compiled version of the currently selected revision on an AR device; initiating a test script for the AR device to test the AR operating system; receiving results of the test script; and updating the list of revisions based on the received results of the test script; and repeating the set of testing operations until a stopping criterion is satisfied.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

GLOSSARY

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers, for example, to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a manner as to encode information in the signal. The terms "transmission medium" and "signal medium" mean the same thing and may be used interchangeably in this disclosure.

"User device" refers, for example, to a device accessed, controlled or owned by a user and with which the user interacts with to perform an action or interaction on the user device, including an interaction with other users or computer systems.

CONCLUSION

As used in this disclosure, phrases of the form "at least one of an A, a B, or a C," "at least one of A, B, or C," "at least one of A, B, and C," and the like, should be interpreted to select at least one from the group that comprises "A, B, and C." Unless explicitly stated otherwise in connection with a particular instance in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

The various features, steps, and processes described herein may be used independently of one another, or may be combined in various ways. All possible combinations and subcombinations are intended to fall within the scope of this disclosure. In addition, certain method or process blocks may be omitted in some implementations.

What is claimed is:

1. A system comprising:
at least one processor; and
at least one memory component storing instructions that, when executed by the at least one processor, cause the at least one processor to perform operations comprising:
identifying a list of revisions for an Extended Reality (XR) operating system;
performing a set of testing operations comprising:
dividing the list of revisions to set a currently selected revision of the XR operating system;
retrieving an already-compiled version of the currently selected revision of the XR operating system;
installing the already-compiled version of the currently selected revision on an XR device;
initiating a test script for the XR device to test the XR operating system;
receiving results of the test script; and
updating the list of revisions based on the received results of the test script; and
repeating the set of testing operations until a stopping criterion is satisfied.

2. The system of claim 1, wherein updating the list of revisions comprises: in response to the test script passing, removing older revisions than the currently selected revision from the list of revisions.

3. The system of claim 2, wherein updating the list of revisions comprises: in response to the test script failing, removing newer revisions than the currently selected revision from the list of revisions.

4. The system of claim 1, wherein updating the list of revisions comprises: in response to the test script failing, removing newer revisions than the currently selected revision from the list of revisions.

5. The system of claim 1, wherein the system at most divides the list of revisions $\log_2(n)$ times, wherein n is the total number of revisions.

6. The system of claim 1, wherein the system does not retrieve already-compiled versions of revisions that are not set as the currently selected revision.

7. The system of claim 1, wherein the already-compiled version of the currently selected revision comprises the entire XR operating system.

8. The system of claim 1, wherein the already-compiled version of the currently selected revision comprises only a portion of the XR operating system.

9. The system of claim 1, wherein the operations further comprise:
receiving, from a user of the system, a span of revisions; and
removing revisions that are not included in the span of revisions from the list of revisions.

10. The system of claim 9, wherein receiving the span of revisions comprises receiving a selection of a time frame.

11. The system of claim 1, wherein the list of revisions is in chronological order.

12. The system of claim 1, wherein the test script is configured to identify an error present in a latest revision of the XR operating system, wherein the test script is configured to run on revisions other than the latest revision.

13. The system of claim 1, wherein the test script is configured to detect a performance metric or a battery usage metric.

14. The system of claim 1, wherein the test script is transmitted to the XR device, and the XR device is configured to run the test script locally.

15. The system of claim 1, wherein the test script is run on the system, wherein the test script initiates input to be sent to the XR device.

16. The system of claim 1, wherein installing the already-compiled version includes flashing the already-compiled version onto the XR device.

17. The system of claim 1, wherein dividing the list of revisions to set the currently selected revision comprises bisecting the list of revisions.

18. The system of claim 1, wherein the stopping criterion includes determining that a revision that passes the test script is found to be adjacent to a revision that fails the test script.

19. A method comprising:
identifying a list of revisions for an Extended Reality (XR) operating system;
performing a set of testing operations comprising:
dividing the list of revisions to set a currently selected revision of the XR operating system;
retrieving an already-compiled version of the currently selected revision of the XR operating system;
installing the already-compiled version of the currently selected revision on an XR device;
initiating a test script for the XR device to test the XR operating system;
receiving results of the test script; and
updating the list of revisions based on the received results of the test script; and
repeating the set of testing operations until a stopping criterion is satisfied.

20. A non-transitory computer-readable storage medium storing instructions that, when executed by at least one processor, cause the at least one processor to perform operations comprising:
identifying a list of revisions for an Extended Reality (XR) operating system;
performing a set of testing operations comprising:
dividing the list of revisions to set a currently selected revision of the XR operating system;
retrieving an already-compiled version of the currently selected revision of the XR operating system;
installing the already-compiled version of the currently selected revision on an XR device;
initiating a test script for the XR device to test the XR operating system;
receiving results of the test script; and
updating the list of revisions based on the received results of the test script; and
repeating the set of testing operations until a stopping criterion is satisfied.

* * * * *